United States Patent
Collins et al.

(10) Patent No.: US 7,231,139 B2
(45) Date of Patent: Jun. 12, 2007

(54) DIGITAL NOISE REDUCTION FOR MOTORS

(75) Inventors: Mark E Collins, Webster, NH (US); Sumner B Marshall, III, Webster, MA (US)

(73) Assignee: Asahi Kasei Microsystems Co., Ltd., Shinjuku-ku, Tokyo (JP)

( * ) Notice: Subject to any disclaimer, the term of this patent is extended or adjusted under 35 U.S.C. 154(b) by 0 days.

(21) Appl. No.: 11/238,373

(22) Filed: Sep. 29, 2005

(65) Prior Publication Data

US 2007/0047927 A1    Mar. 1, 2007

Related U.S. Application Data

(60) Provisional application No. 60/712,110, filed on Aug. 29, 2005.

(51) Int. Cl.
*H02P 7/06* (2006.01)
(52) U.S. Cl. ............. 388/804; 388/800; 388/811; 388/819; 388/831; 318/254; 318/439; 318/685; 318/696
(58) Field of Classification Search ......... 318/254, 318/439, 685, 696, 599; 388/800–900
See application file for complete search history.

(56) References Cited

U.S. PATENT DOCUMENTS

| | | | |
|---|---|---|---|
| 4,486,696 A | 12/1984 | Matsushita et al. | |
| 5,162,709 A * | 11/1992 | Ohi | 318/254 |
| 5,293,103 A | 3/1994 | Hanna | |
| 5,349,275 A * | 9/1994 | Muller | 318/254 |
| 5,528,721 A * | 6/1996 | Searcy et al. | 388/824 |
| 5,612,599 A | 3/1997 | Itami et al. | |
| 5,731,674 A | 3/1998 | Jeske | |
| 5,782,610 A | 7/1998 | Ikeda | |
| 5,859,519 A * | 1/1999 | Archer | 318/801 |
| 6,157,151 A * | 12/2000 | Yoshitomi et al. | 318/254 |
| 6,300,736 B1 | 10/2001 | De Winter et al. | |
| 6,512,341 B2 * | 1/2003 | Matsushiro et al. | 318/254 |
| 6,573,680 B2 | 6/2003 | Sasama | |
| 6,747,425 B2 | 6/2004 | Marshall, III et al. | |
| 6,747,432 B2 * | 6/2004 | Yoshimura | 318/599 |

(Continued)

FOREIGN PATENT DOCUMENTS

JP    4317598    11/1992

(Continued)

OTHER PUBLICATIONS

Gaede, Kyle, "Suppressing Acoustic Noise in PWM Fan Speed Control Systems", 2003, pp. 1-6, vol. AN771, Microchip Technology Inc.

(Continued)

*Primary Examiner*—Lincoln Donovan
*Assistant Examiner*—Tyrone Smith
(74) *Attorney, Agent, or Firm*—Maine & Asmus

(57) ABSTRACT

A system and method for reducing fan noise by controlling the drive current to the fan motor. In one embodiment the system approximates a linear drive using a number of transistors in parallel and sequentially deploying the transistors. In another embodiment, a scheme is used to activate and deactivate transistors in discrete steps thereby achieving the benefits of the linear controller topology.

20 Claims, 13 Drawing Sheets

U.S. PATENT DOCUMENTS 6,757,592 B1 6/2004 Henderson et al.
6,856,110 B2 * 2/2005 De Winter et al. ......... 318/254

FOREIGN PATENT DOCUMENTS

JP 200023496 1/2000

OTHER PUBLICATIONS

Alfano, Don, "Supressing Acoustic Noise in PWM Fan Speed Control Systems", Mar. 4, 1998, pp. 1-3, vol. Application Note 58, TelCom Semiconductor, Inc.

Laulanet, Francois et al., "Solving Cooling Fan Problems with a Smart Sensor", Jun. 2000, pp. 1-8, [online] [retrieved on Jun. 6, 2002]Retrieved from the internet <URL:http://www.sensorsmag.com/articles/0600/83/main.shtml.

"US79 Series CMOS Power Hall IC", Jan, 23, 2001, pp. 1-4, Rev. 3.0, Melexis Microelectronic Integrated Systems.

Marshall, Brad, "DC cooling fan controller IC eliminates components and failure mechanisms", International IC—China Conference Proceedings, pp. 320-327, Melexis, Inc., NH, No date.

Burke, Mary, "Why and How to Control Fan Speed for Cooling Electronic Equipment", Feb. 2004, vol. 38-02, [online] Retrieved from internet <URL:http://www.analog.com/analogdialogue.

* cited by examiner

2 Coil Adaptive Logic Timing

1 Coil Adaptive Logic Timing

DIGITAL NOISE REDUCTION FOR MOTORS

RELATED APPLICATIONS

This application claims the benefit of U.S. Provisional Application No. 60/712,110, filed Aug. 29, 2005, which is herein incorporated in its entirety by reference.

FIELD OF THE INVENTION

The invention relates to motors, and more particularly, to reducing noise of cooling fan motors.

BACKGROUND OF THE INVENTION

The general trend in electronic equipment and products is towards faster and smaller products. As a result, heat dissipation has become an increasing concern as hotter components are placed into smaller packages and form factors. Excessive heat is linked to numerous types of component failures that result in reduced longevity, and partial or catastrophic failure.

There are a number of design parameters that are used to dissipate heat and otherwise cool the electronic components. Heat sinks and heat pipes are used as passive mechanisms to remove heat or at least quietly disseminate the heat. However in many electronic devices, active cooling is required. Fans have proven to be an excellent tool to generate airflow and maintain a satisfactory environment in many electronic products. Larger products or those with greater heat generation sometimes use multiple fans to establish an optimum environment.

There are a number of problems associated with fans, including acoustic noise, power consumption, and reliability. Designers are always trying to optimize fans by balancing various factors for a particular product to establish the lowest power and the least noise while still maintaining a cool environment. It is well established that proper fan speed control not only extends the life of the fan but is more efficient in terms of power requirements.

A common type of fan in electronic products is the brushless DC motor fan. Such fans operate in much the same manner as DC electric motors, and employ a stator/rotor configuration. The brushless DC motor relies on an external power drive to perform the commutation of stationary winding on the stator, wherein the changing stator field causes the permanent magnet rotor to rotate. Electronically commutated brushless DC motor systems are typically used as drives for blowers and fans used in electronics, telecommunications and industrial equipment applications. There is a wide variety of different brushless motors for various applications.

Fans are typically categorized as 2-wire fans, 3-wire fans, and 4-wire fans. The 2-wire fan has power and ground terminals, and is generally controlled by adjusting either the dc voltage or the pulse width. As there is no tachometric signal, there is no simple indication of the fan speed. A 3-wire fan has power, ground, and a tachometric output. A 3-wire fan can be controlled using the same kind of drive as a 2-wire fan such as a variable dc or a low-frequency PWM, and uses the tachometric signal to check fan speed. A 4-wire fan has power, ground, a tachometric output, that can be employed with a pulse width modulated (PWM) drive input. The PWM uses the relative width of on/off pulses in a train to adjust the level of power applied to the fan motor.

In addition to having various types of fans, there are an associated variety of control systems for the fans. While the fan can be operated with no control aspects, it is inefficient and generates considerable noise by simply operating at full speed. Typically, there are two speed control methods, supply Voltage control and PWM at frequencies above 20 KHz. The Low frequency PWM is not generally used in the industry.

The supply voltage controls the DC voltage applied to the fan motor thereby controlling the fan speed. For quieter operation and lower air flow, the voltage is decreased. If more cooling is required, the voltage is increased which increases the cooling capability and also the noise. As is well known in the art, there are limitations to the relationship of fan speed and input voltage such as startup voltage and stalling problems as well as power inefficiencies.

The majority of small personal computer fans employ PWM controls wherein the voltage applied to the fan is either zero or full voltage switched at >20 KHz to eliminate audible noise.

The cooling fan audible noise is an objectionable by-product of moving air to produce convection cooling. There are several major sources of audible noise in fans, including blade noise, "second harmonic cogging", as well as commutation noise. The blade noise and cogging cannot be appreciably influenced by electrical designs. However, it is possible to reduce commutation noise via improved circuit design. A circuit design that slows down the current transitions produces less noise.

As noted, the speed of the fan is one of the factors related to the fan noise. At low revolutions per minute (RPM), for example 1400 RPM, the fan audio noise and RFI noise are typically fairly small. At such lower RPMs, the noise is almost entirely comprised of commutation noise. At higher fan speeds, the blade noise begins to contribute to the total fan noise which typically increases significantly at higher RPMs. The blade noise is generally controlled by mechanical design. It is understood that other fans have different requirements and conditions as well as different blade noise starting points.

There have been many attempts at reducing noise generated by cooling fans. These methods may include both mechanical and electrical techniques that seek to provide proper cooling but at a lower power and noise. For example, the linear drive has been enhanced using operational amplifiers or capacitors for bypassing the motor coil as one mechanism to reduce fan noise. Other implementations describe noise reduction by blade design and other mechanical layouts. High frequency PWM schemes keep the fan noise above the human audible range.

What is needed is an improvement to the fans used for heat removal. Such a system should allow for the benefits of the linear drive control in terms of low noise but without the more excessive power consumption.

SUMMARY OF THE INVENTIONS

The present invention in one embodiment provides a system for reducing fan noise by approximating a linear drive using a number of transistors in parallel and sequentially deploying the transistors.

Another embodiment of the present invention provides a scheme to turn on drivers in discrete steps thereby achieving the benefits of the linear controller topology in an efficient manner and without undue power dissipation. One aspect includes approximating a linear slope with digital steps for the coil current rise and fall times.

One embodiment is a motor controller system for reducing fan noise comprising a plurality of transistors coupled in parallel forming a first transistor segment, and a plurality of transistors coupled in parallel forming a second transistor segment. There is a first fan coil coupled to the first transistor segment on a first end and coupled to a supply voltage of a second end. A second fan coil is coupled to the second transistor segment on a first end and coupled to the supply voltage of a second end. A first sequencing logic section is coupled to each of the transistors in the first transistor segment, wherein the first sequencing logic section sequentially activates and deactivates at least some of the transistors in the first segment. There is also a second sequencing logic section coupled to each of the transistors in the second transistor segment, wherein the second sequencing logic section sequentially actives and deactivates at least some of the transistors in the second segment. A rise time and a fall time of the first fan coil and the second fan coil is controlled so as to avoid abrupt or steep changes. The control of the L/R time constant eliminates or significantly reduces the steep changes such that the rise and fall times of the coil current is substantially linearized. As noted, the number of transistors in the segments may vary. In one embodiment a voltage regulator is coupled to the first coil and the second coil.

The system may further comprise an adaptive logic section coupled to the first and second sequencing logic section. The system can also include a magnetic sensor coupled on one end to the first end of the first fan coil and the first end of the second fan coil, and coupled on another end to the first sequencing logic section and the second sequencing logic section.

The first and second sequencing logic section in one embodiment sequentially actives and deactivates all of the transistors in the first and second segment. The first and second sequencing logic section can be integral. Furthermore, the rise time and the fall time can be programmable.

A method for controlling a motor, comprising: coupling at least one transistor segment to at least one motor coil, wherein each transistor segment has a plurality of transistors. The method includes sequentially activating the transistors of the transistor segment thereby sequentially increasing a current flow through the coil, wherein the sequentially activating is done within a turn-on window. Also, sequentially deactivating the transistors of the transistor segment thereby sequentially decreasing a current flow through the coil, wherein the sequentially deactivating is done within a turn-off window. Finally, processing the turn-on window and the turn-off window to provide a linearly controlled rise time and a linearly controlled fall time, thereby eliminating abrupt changes that produce excessive noise. The method may include repeating the steps of sequentially activating and sequentially deactivating for other transistor segments. The number of transistors in the transistor segment can be programmable.

The linearized rise time may be different than the linearized fall time. The fall time can be linearized by controlling the L/R decay. In addition, the linearized rise time and the linearized fall time can be a percentage of a total cycle period. The method includes wherein the processing is based on a number of clock cycles of a slew clock.

A further step is preventing simultaneously activating any of the transistors of a first segment with any of the transistors of a second segment. The method further comprises a means for electronically adapting to different motors.

A further embodiment is an apparatus for controlling a DC motor, comprising a magnetic sensor coupled to the motor with at least one sequencing logic section coupled to the magnetic sensor and with a transistor segment coupled to each sequencing logic section. The transistor segment has a plurality of transistors in each segment, and the number of transistors can vary as between segments and can also be programmable. There is at least one motor coil coupled to at least one transistor segment, wherein a rise time and a fall time of a coil current of each coil is linearly controlled. The transistors can include at least one of field effect transistors and bipolar transistors.

There can be an adaptive control logic section coupled to each sequencing logic section, wherein the adaptive controller may comprise a microcontroller and memory. The entire circuit can also be integrated onto a single chip.

The apparatus can further comprise a full bridge configuration having four of the transistor segments coupled to a single coil.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6b shows an idealized waveform created by the sequencing system of FIG. 6a.

FIG. 8b is a graphical perspective showing the linear approximation of FIG. 8a.

DETAILED DESCRIPTION

In a simple form, the present invention reduces noise by controlling the drive current to gradually turn 'On' and/or 'Off' the motor windings of the fan or other, such as 1 phase motors, 2 phase motors, 3 phase motors and 4 phase motors. In one aspect, the present method approximates a linear drive by using a number of power transistors, such as field effect transistors (FETs), in parallel and sequentially processing the transistors, such that there is a gradual change in drive current between successive steps. As detailed herein, the commutation noise can be reduced by controlling the drive current to gradually turn on the motor windings rather than applying a square wave drive as is typically employed in the art.

Figure 1:
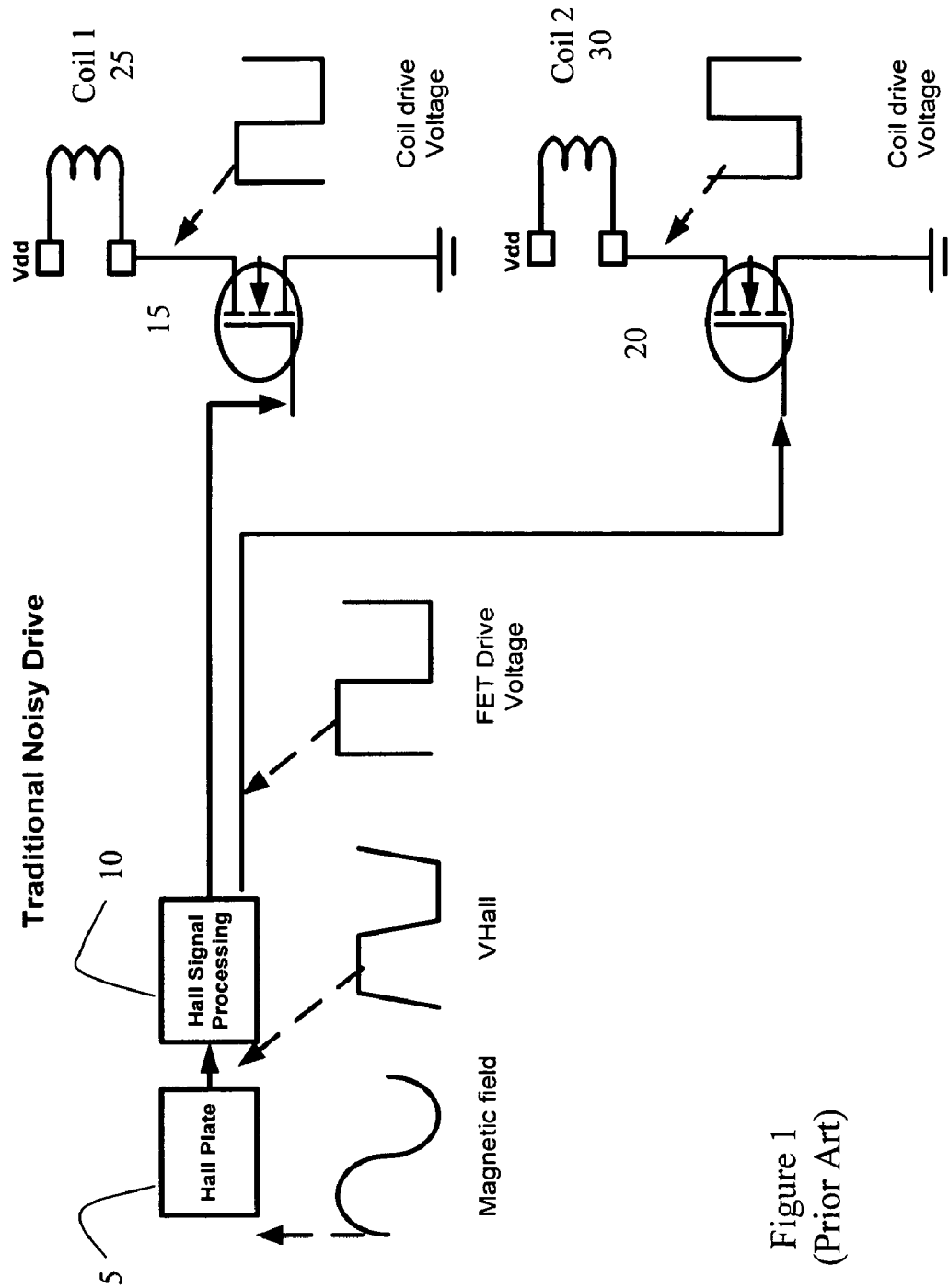
FIG. 1 illustrates a traditional noisy drive for a two coil DC motor where the coil drive is a square wave.

FIG. 1 show a prior art configuration of a traditional noisy fan control arrangement for a two coil DC motor where the coil drive is a square wave. The fan noise is produced by rapid current changes wherein the dramatic switching of the current 'On' and 'Off' creates commutation noise.

The Hall plate 5 and Hall signal processing section 10 are configured as a magnetic sensing device such that the output of the processing section 10 switches between two defined states according to the imposed magnetic field. The magnetic field input to the Hall plate 5 is shown as a sinusoidal signal and oscillates between threshold levels that trigger the Hall signal processing section 10 to latch a state until the next threshold is crossed. The latching is very fast and transitions quickly from one state to the next in an abrupt manner, which tends to produce significant commutation noise. The output of the Hall plate 5 is a rough square wave that tracks the magnetic field sine wave.

The output of the processing section 10 is two square waves that are the transistor drive voltage for the transistors 15, 20. The coils 25, 30 are driven by the power transistors 15, 20 respectively, wherein the switching of the power transistors 15, 20 is done via control signals. The coil drive voltage is also a square wave with a corresponding noise problem, wherein coil 1 25 operates as the reciprocal of coil 2 30 such that the two coils are not simultaneously 'On' at the same time.

As is known in the art, the timing operations and switching control requires some form of a control function. In operation, the system of FIG. 1 provides a "make-before-break" switching to insure that both drivers 15, 20 are not 'On' at the same time, and to avoid a "glitch" in voltage to voltage regulators. Simultaneous conduction is undesirable in that it creates noise and wastes power by trying to turn the motor both clockwise (CW) and counter clockwise (CCW) at the same time. The control monitors the Hall circuit output states and generates the timing signals that switches and correspondingly connects or disconnects the coils 25, 30 to the voltage, Vdd.

Figure 2:
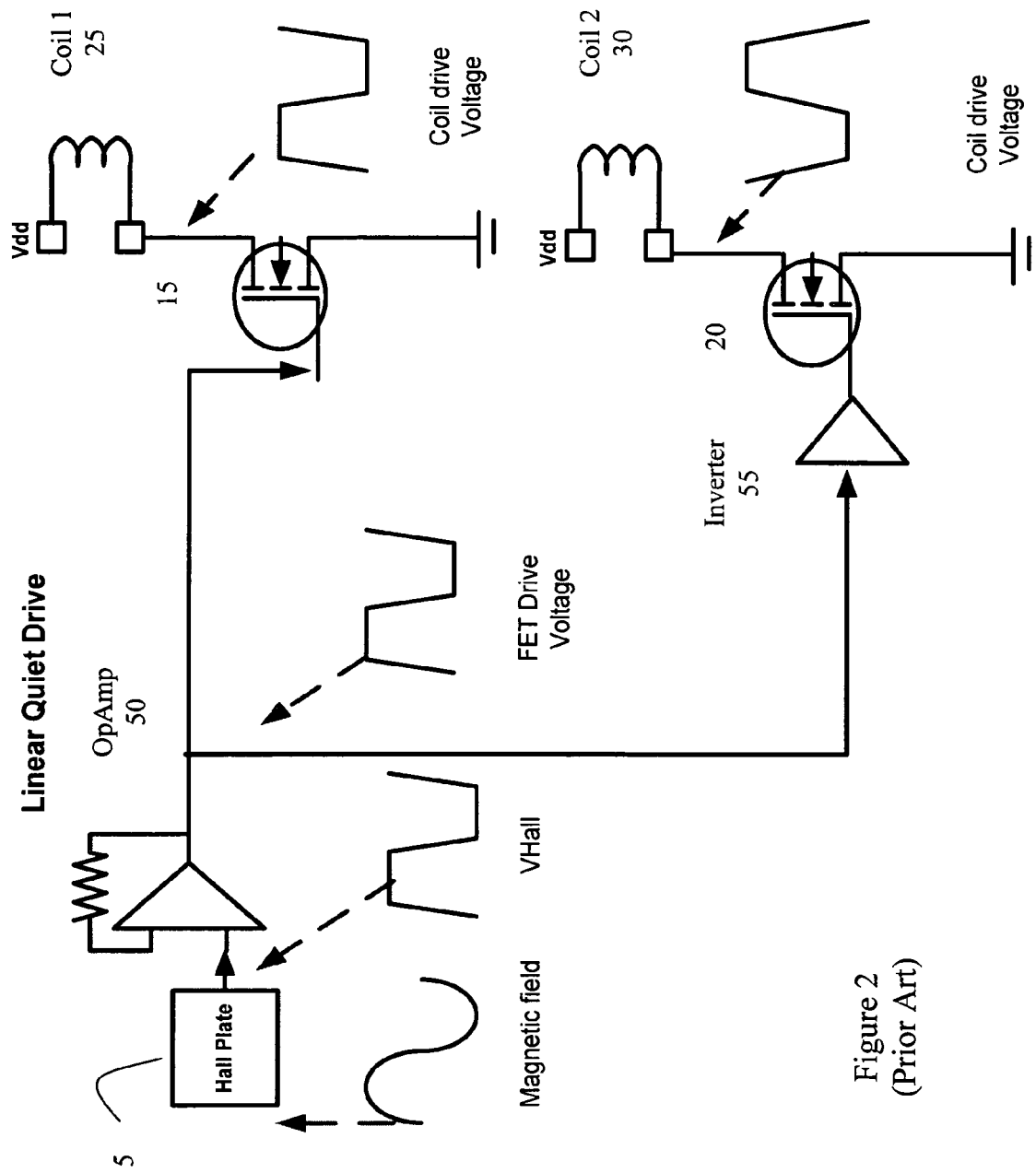
FIG. 2 shows a traditional linear drive using an operational amplifier.

FIG. 2 illustrates a typical linear drive using an Operational Amplifier configuration coupled to the Hall plate 5 to produce some slope to the Hall output signal. While this is typically a quieter design, it has Class A power dissipation and generally requires a discrete Hall Element. This configuration generally is not performed in a one-chip system that is desired by many manufacturers.

Once again, the sinusoidal magnetic field is the input to the Hall plate 5 wherein the Hall plate output is not a latched digital signal but rather has some slope that can give it some linearity. The output of the Hall plate is the input to the OpAmp section 50 wherein this design uses an OpAmp 50 with gain that produces the transistor drive voltage. While providing some linearity, this design has considerable offset such that it typically requires a much larger Hall signal and is not easily implemented in a single chip design. The thermal characteristics are also usually unfavorable.

The transistor drive voltage from the OpAmp 50 is coupled directly to transistor 15 which produces a coil drive voltage that activates coil 1 25. The transistor drive voltage from the OpAmp 50 is also coupled to an inverter 55 and then to transistor 20 which produces a coil drive voltage that activates coil 2 30. In a general sense, the linear drive voltage replicates the magnetic field of the stator in this design.

Figure 3:
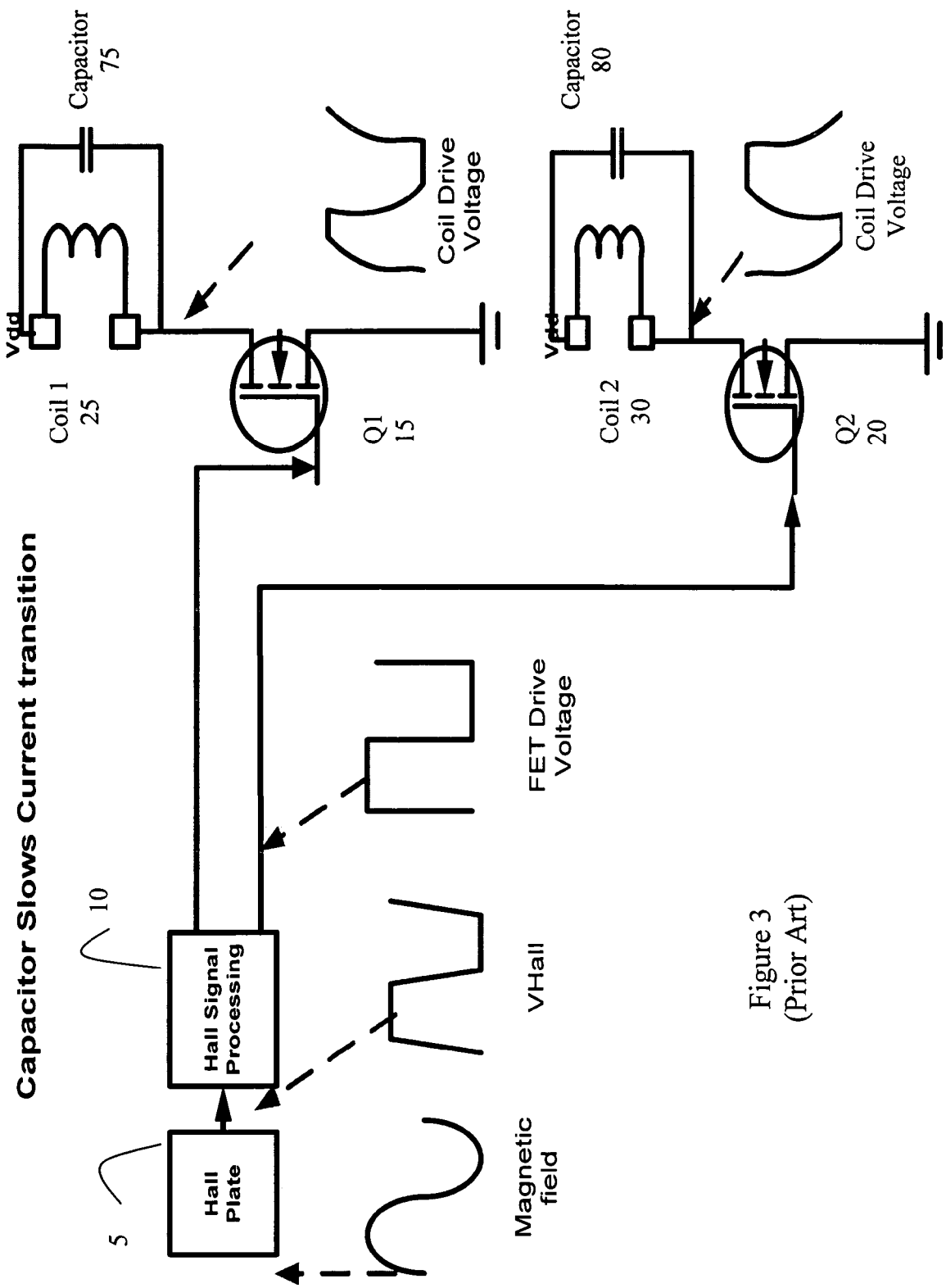
FIG. 3 depicts a motor scheme wherein a capacitor coupled to the motor coils is used to slow the current change and lower the fan noise.

The circuit design of FIG. 3 depicts another existing motor scheme wherein a capacitor is used to slow the current change and reduce fan noise. This design is similar to the FIG. 1 design, with the addition of capacitors coupled to the coils.

In more particular, the sinusoidal magnetic field input to the Hall plate 5 is converted the VHall signal which is then input to the Hall signal processing 10. The output of the Hall signal processing section 10 is a square wave transistor drive voltage for each of the power transistors 15, 20. The square wave drive voltage is coupled to the respective transistor 15, 20 such that the square waves are reciprocal and the transistors 15, 20 are not turned 'On' at the same time. The coils 25, 30 are turned 'On' and 'Off' as noted herein, but the capacitors 75, 80 on each coil 25, 30 tends to slow the current transition. Placing large capacitors 75, 80 around the motor coils absorbs the voltage switch and generates a somewhat gentler switching scenario. As noted herein, packaging is a concern and a large capacitor in the design is expensive and makes the packaging requirements more difficult.

Figure 4:
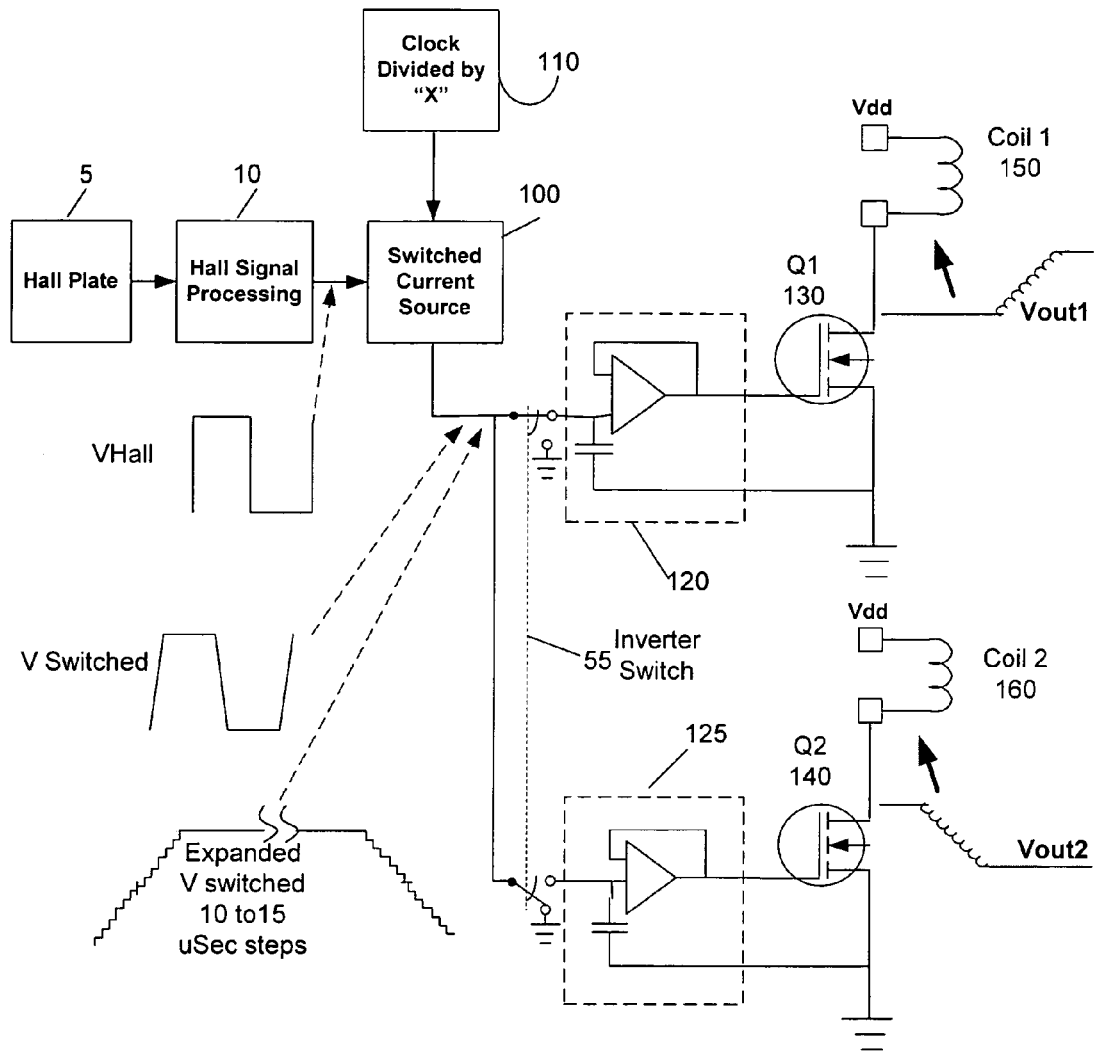
FIG. 4 shows a circuit design that approximates a linear slope using a switched current source.

FIG. 4 shows a switched drive system using electronic circuitry to approximate a linear slope, wherein a linearizing circuit is used to electronically slow the current change as the coils are switched. The technique produces an approximate linear slope, but is also a Class A drive.

As previously noted, a magnetic field is input to the Hall plate 5 and the resulting signal is the processed by the Hall signal processing section 10 to approximates a square wave. The output from the Hall signal processing section 10 is the input to a switch current source 100 that is clock divided by 'X' 110. The switched voltage output is shown expanded into 10–15 microsecond steps which are the input to the OpAmp circuit 120 that drives the power transistor 130 which in turn activates the first coil 150. The Switched Current source 100 charges the capacitor (via the Inverter Switch 55) which adds some delay and thereby introduces linearity into the switched voltage. The switched voltage output is also input to the OpAmp 125 (via the Inverter Switch 55) that drives transistor 140 which in turn actuates coil 2 160. The result of the switched drive is an approximated linearized output with lower noise however it is a class A drive.

Figure 5A:
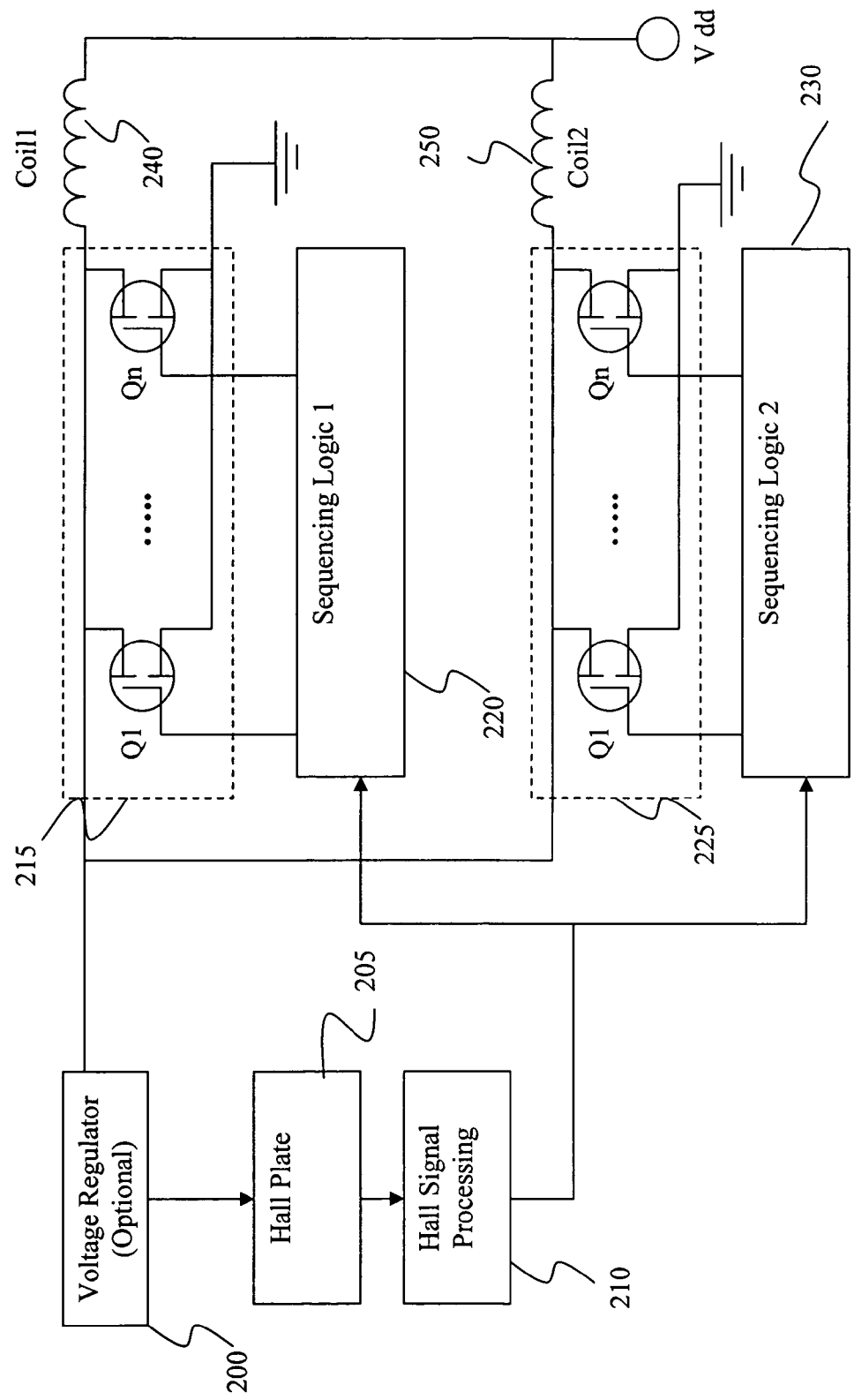
FIG. 5a is a block diagram perspective showing a sequential turn on drive system configured in accordance with a two coil embodiment configured in accordance with one embodiment of the present invention.
Figure 5B:
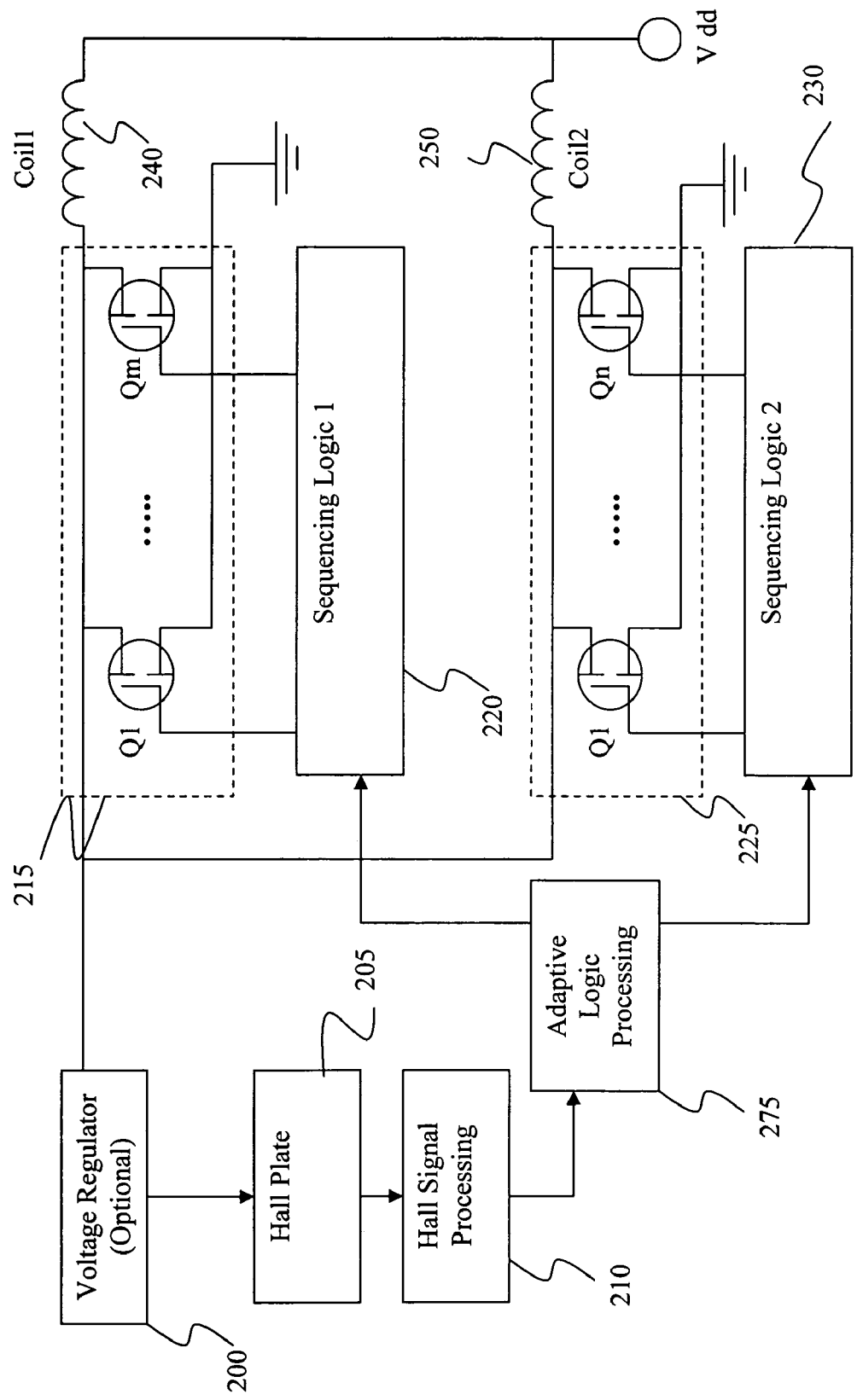
FIG. 5b is a block diagram perspective showing a sequential turn on drive system and an adaptive logic system configured in accordance with a two coil embodiment configured in accordance with one embodiment of the present invention

FIG. 5a and 5b represent simplified embodiments of the present invention that linearizes the output, showing a circuit design implementing the sequential drive system. It is appropriate for at least 1, 2, 3 or 4 coil designs.

Referring to FIG. 5a, a sinusoidal magnetic field signal is the input to a Hall plate 205 which is then processed by a Hall signal processing section 210. The output from the Hall signal processing section 210 is input to a pair of sequencing logic sections 220, 230. While the sequencing logic section 220, 230 are shown as separate elements, the functionality of the sequencing logic section can be integrated within a single device.

The Hall sections 205, 210 help define which coil will be energized and prevent simultaneous conduction and encompass various signal processing such as analog or digital.

There are two transistor segments 215, 225 each with a plurality of transistors Q1–Qn that are in parallel and tied to respective sequencing logic units 220, 230. The use of Q1–Qn in the transistor segments is not intended to indicate that the transistor segments will always have equal number of transistors. There can be any number of transistors in each segment 215, 225 however a typical range is 4–12 transistors. The choice as to the number of transistor in a segment is generally one of desired result, cost/benefit and packaging, as the separate transistors use chip area and increases cost. The transistors can be any of the power transistor types such as FETs and bipolar transistors.

In one embodiment, the number of transistors is directly related to the desired linearity which in turn relates to the number of steps. For example, the rising and the falling edge of the coil output current can be accomplished at about 10% of each 'On'/'Off' cycle thereby having about 80% of the signal in the latched state. The desired slope can then be spread over a number of transistors at the RPM speed to provide the linerization.

The supply voltage, Vdd, is tied to each of two coils 240, 250 with each coil coupled to a transistor segment 215, 225 having transistors Q1–Qn that sequentially drive the current through the coils. The voltage regulator (optional) 200 and Hall plate 205 and Hall processing section 210 cooperate with the sequencing logic sections 220, 230 to apply power to a respective coil 240, 250 one at a time.

For illustrative purposes, the following describes a possible processing scenario. The transistors Q1–Qn of both sections are initially 'Off' and no current is flowing through the coils 240, 250. Once the supply voltage is turned 'On' and the DC motor is operating, the sequencing logic section 220 turns on the transistors Q1–Qn of the first transistor segment 215 one at a time thereby avoiding a sharp current swing noted in the state of the art designs. The control and timing features prevents transistors of each of the transistor segments 215, 225 from being turned 'On' at the same time. In one embodiment the steps are discrete and each transistor is turned 'On' from Q1 to Qn. This technique provides the advantage of a linear drive but avoids the penalty of high power dissipation of linear Class A drive.

The sequencing logic section 220, 230 can control the timing of the drivers in a number of different schemes. In one embodiment the sequencing is done with a clock, however this can be varied depending upon the voltage supply and the motor RPM. Thus, the sequencing section 220, 230 adapts to the time between commutation cycles and time constant of the resistance/inductance of the motor. This is further described in conjunction with FIG. 9.

Referring to FIG. 5b, another embodiment includes an adaptive control logic section 275 coupled at the output of the Hall signal processing to control the sequence logic sections 220, 230. The adaptive logic controller 275 adds flexibility by increasing the voltage ranges and greater variety of fans. The adaptive control logic section 275 is coupled to the sequencing logic sections 220, 230 and takes over the processing to control the timing aspects of the transistors Q1–Qm and Q1–Qn in the transistor segments 215, 225. As noted, the number of transistors in the segments can be varied depending upon the design criteria.

Figure 6A:
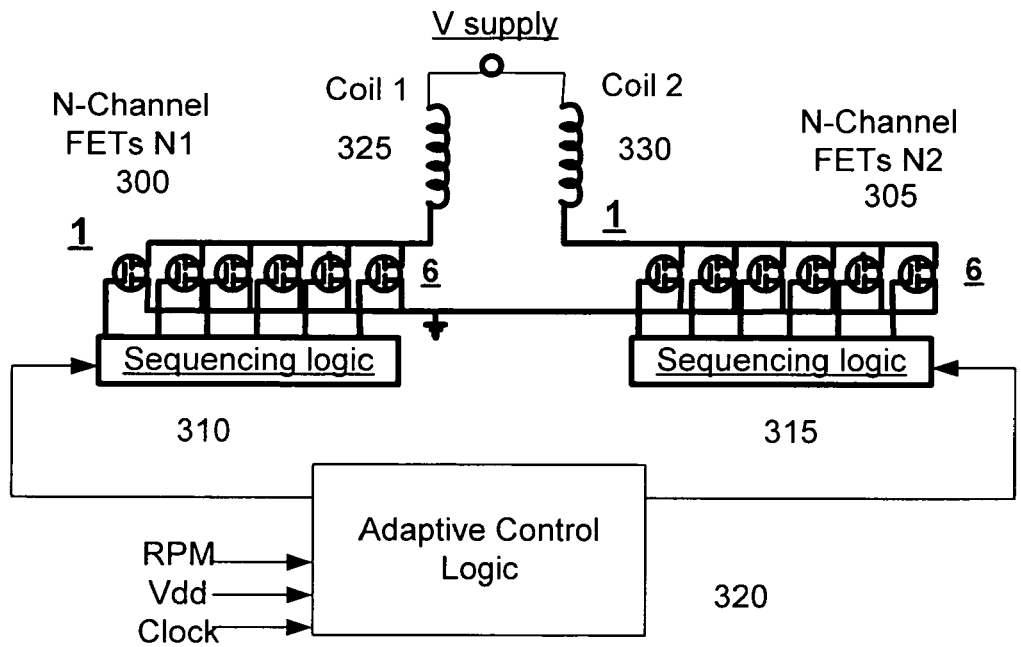
FIG. 6a is a block diagram of a two coil sequencing system with an adaptive logic control section configured in accordance with one embodiment of the present invention.

FIG. 6a shows one embodiment of the present invention for a two coil DC motor showing a pair of N-channel FET segments 300, 305 having six transistors apiece and coupled to respective sequencing logic sections 310, 315 on one end and each transistor segment coupled to a coil 325, 330 of a motor on the other end. While depicted with N-channel FETs, the present invention is not limited to FETs and may be implemented with other transistor types.

In this particular embodiment, the adaptive control logic section 320 is coupled to each sequencing logic section 310, 315 allowing the transistors for a particular segment to be operated sequentially. The inputs to the adaptive control section 320 may include the voltage supply, Vdd, a clocking source, and the speed of the motor (RPM). With respect to each coil segment 325, 330, there is no current flow with all the transistors 'Off', but as the transistors in a segment are sequentially turned 'On' one at a time, the current flow increases until some or all of the transistors of a segment are turned 'On'. Likewise, as the transistors are sequentially turned 'Off', the current decreases. The number and type of transistors depends upon the design and desired result. As noted, the number of transistor actually activated may be less than the total number of transistors in the transistor segment.

In one embodiment the Adaptive Logic Circuitry 320 performs two separate functions. The first function is to adapt the Turn-On Current Slope and Turn-Off Current Slope to the RPM of the motor. Each Turn-On and Turn-Off Slope Period is adaptively set to be some percentage of the time of the entire Hall Period (Magnetic Field Polarity Period). As the motor speed (RPM) continuously changes, each Turn-On and Turn-Off Slope Period is adaptively adjusted to some percentage of the Hall Period, which for illustrative purposes is set to be approximately 10%. It should be readily apparent that the percentage can vary depending upon the design and desired results. The percentage can be based on the amount of noise, efficiency and the desired results. In one embodiment the percentage is based on the number of clock cycles for the Magnetic Field Polarity Period.

The second function is to adaptively adjust the timing of the start of the Turn-Off Slope Period to occur at a point in real time that is equal to some percentage of time before the end of the Hall Period actually occurs. In other words, to predict when the next Hall Polarity Change will occur and set the Turn-Off process so as to start 10% time before this time. And then to smoothly (quietly) turn off the coil current during this time, so as to just complete coil current turn-off at the time that the Hall Polarity does occur in real time. In this example, 10% time is utilized based on empirical data of several motors.

In one embodiment the adaptive control logic section can be a microcontroller or microprocessor. There can be some memory and clock processing such that the percentage of rise/fall is based on the number of clock cycles of the slew clock. The adaptive controller monitors cycle-to-cycle clock signal timing functions and processes those signals according to design criteria. One schema for altering the rise and/or fall time is to adjust the slew clock. Another schema for altering the rise/fall time would be to alter the number of clock counts.

Figure 6B:
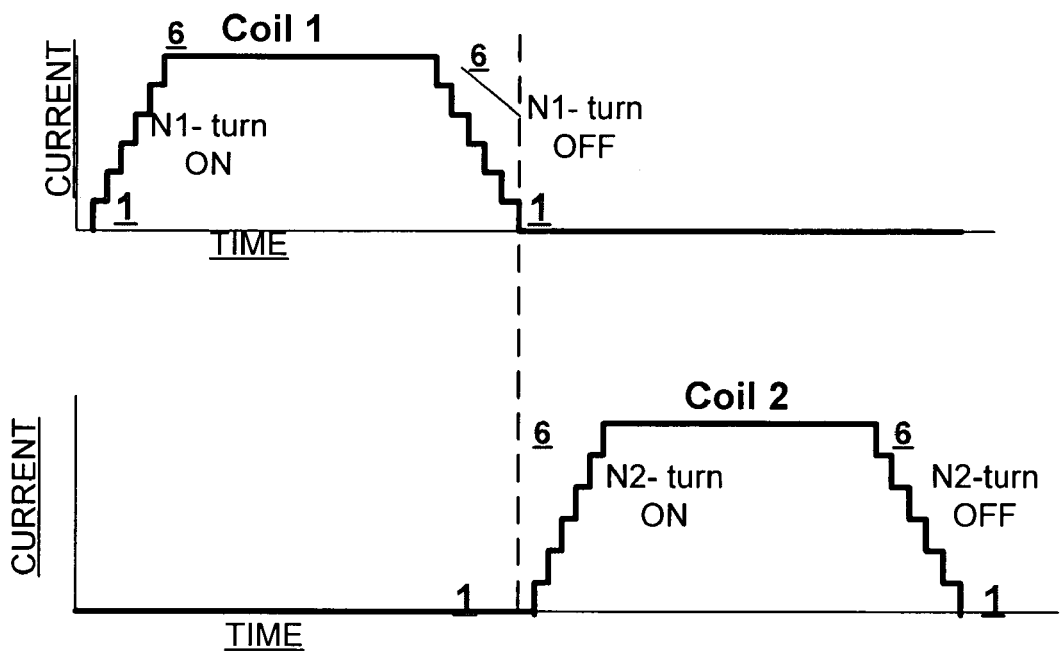

The graphical perspective of FIG. 6b illustrates the operation of coil 1 wherein as transistor 1 is turned 'On' at T1, and there is a small increase in the current flow through coil 1. As each transistor in the transistor segment 325 is turned 'On', the current flow increases until it reaches its maximum value with the activation of transistor 6 at time T6. In this depiction, the timing for the activation is approximately the same for each transistor.

The linear approximation line illustrates the general slope and characteristics of the present invention that emulates the linear drive system in some respects as to the slowly increasing current flow through the coil, but without the negative aspects associated with the linear drive. Unlike microstepping techniques used in other electronic applications that are designed to approximate a sine wave, the present system is designed to approximate the slope of a line in such a manner as to minimize abrupt current swings and thereby minimize commutation noise.

Referring again to FIG. 6*b*, the representative graph shows current versus time with six steps used to reach the maximum current level. Each step has a riser portion and a step portion. It should be readily appreciated that the number of transistors relates to the number of steps, and is selected based on the design parameters.

One goal of the present invention is to have the fastest possible slope without generating noise. Some motors have high inductance and low resistance while others have high resistance and low inductance, so the present design accommodates many different motors.

While generally described herein in terms of discrete steps, the present invention also includes embodiments addressing non-discrete steps. For example, when the steps decrease in time-width, or in other words, increase in quantity. The reason is that each step results in an increase in bridge or driver resistance, which means a decrease in coil-bridge time constant (time constant approximately equals $L_{coil}/(R_{coil}+R_{bridge})$). For example, in FIG. 6*a*, the driver resistance is a combination of the NFET and Coil resistance. The rate at which the circuit can de-energize the coil is reflected by the coil-bridge time constant equation.

Since the reduction of coil current is an exponential function of the coil-bridge time constant, and the greatest rate of current reduction is during the initial time of each step, then reducing the time-width of each step as it progresses through the step sequence results in faster current reduction. This means a faster current reduction without noise generation, whereas the noise generation is a result of voltage or current discontinuities. And, this faster processing is without potential loss of torque which can result if current is reduced too early, and potential torque generation is lost.

Figure 7:
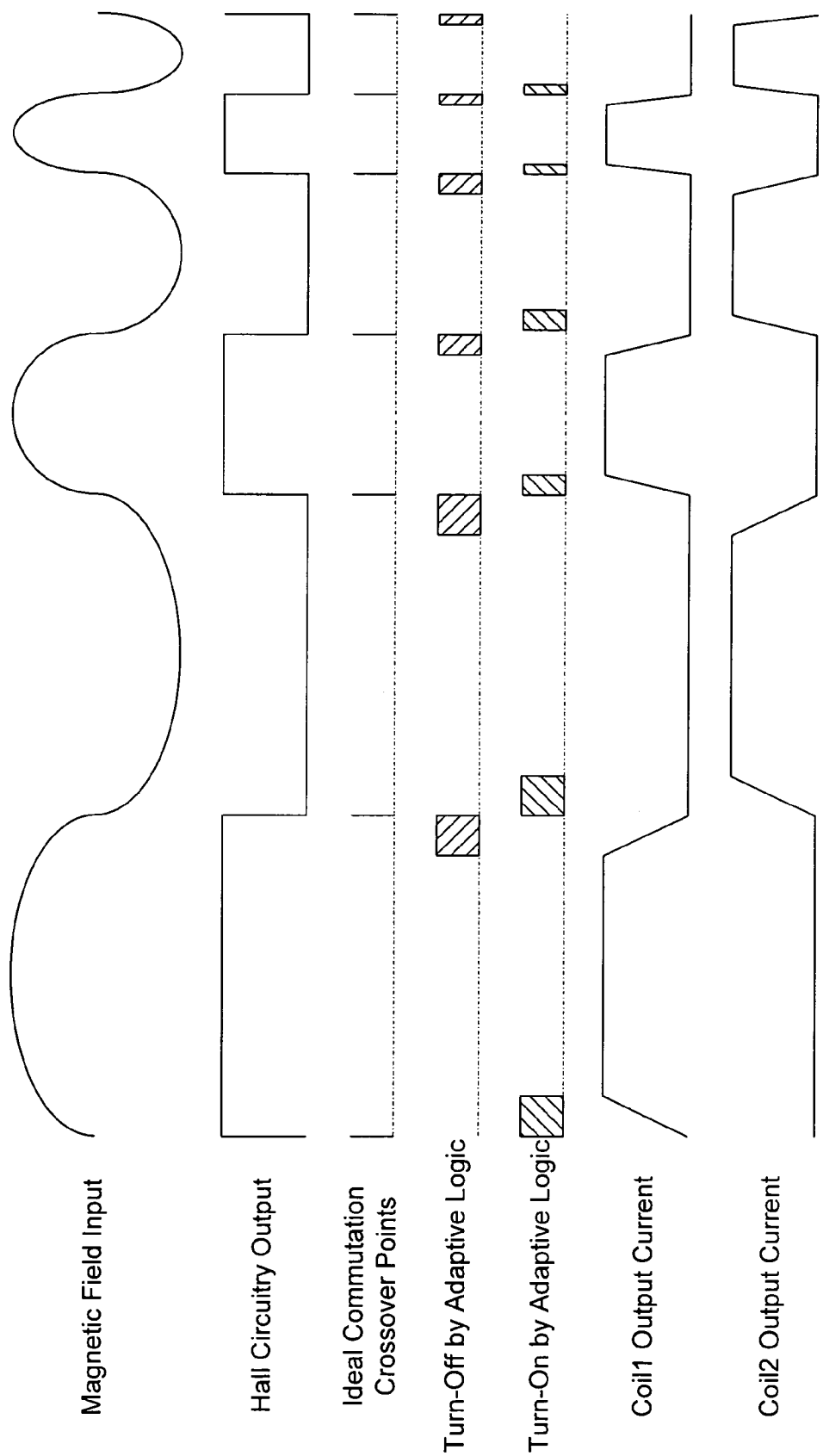
FIG. 7 shows a graphical perspective of the various signals of a two coil motor in order to illustrate timing aspects configured in accordance with one embodiment of the present invention.

FIG. 7 is a perspective view of a coil adaptive logic timing diagram showing the various signals for a two coil DC motor. The magnetic field is shown as a sinusoidal wave that tracks the speed of the motor (RPM). As shown, the time period for a cycle of the magnetic field 'shrinks' if viewed from left to right, indicting an increase in the speed of the motor. The Hall circuitry output tracks the magnetic field input but is approximately a square wave signal. The ideal commutation crossover points are indicated at the rising and falling edges of the Hall output. The Turn-On and Turn-off by Adaptive logic windows are indicated and represent the respective rise time period and fall time period which is set by the adaptive logic section in this embodiment. The window representing the rise and/or fall time can be a percentage of the Hall signal. For example, the rise/fall time can be 10% each and the remaining 80% portion can be the peak level.

As shown, the motor speed increase that causes the Hall output cycle to be shorter and therefore the rise/fall time period is also shortened. One embodiment of the present invention adjusts the percentage value for the rise/fall windows depending upon the motor speed. For example, at faster speeds, the 10% window may still be too fast and cause excessive noise. In such a scenario, the percentage can be adjusted to a larger percentage such as 15%. The percentage, including any adjustment due to the increased speed depends upon design criteria and can be application specific.

The Coil 1 and Coil 2 output current waveforms are depicted and show the linearized rise and fall for each coil current. As the rise and fall times in this embodiment are a set percentage, the rise/fall time period decreases as the motor speed increases.

Figure 8A:
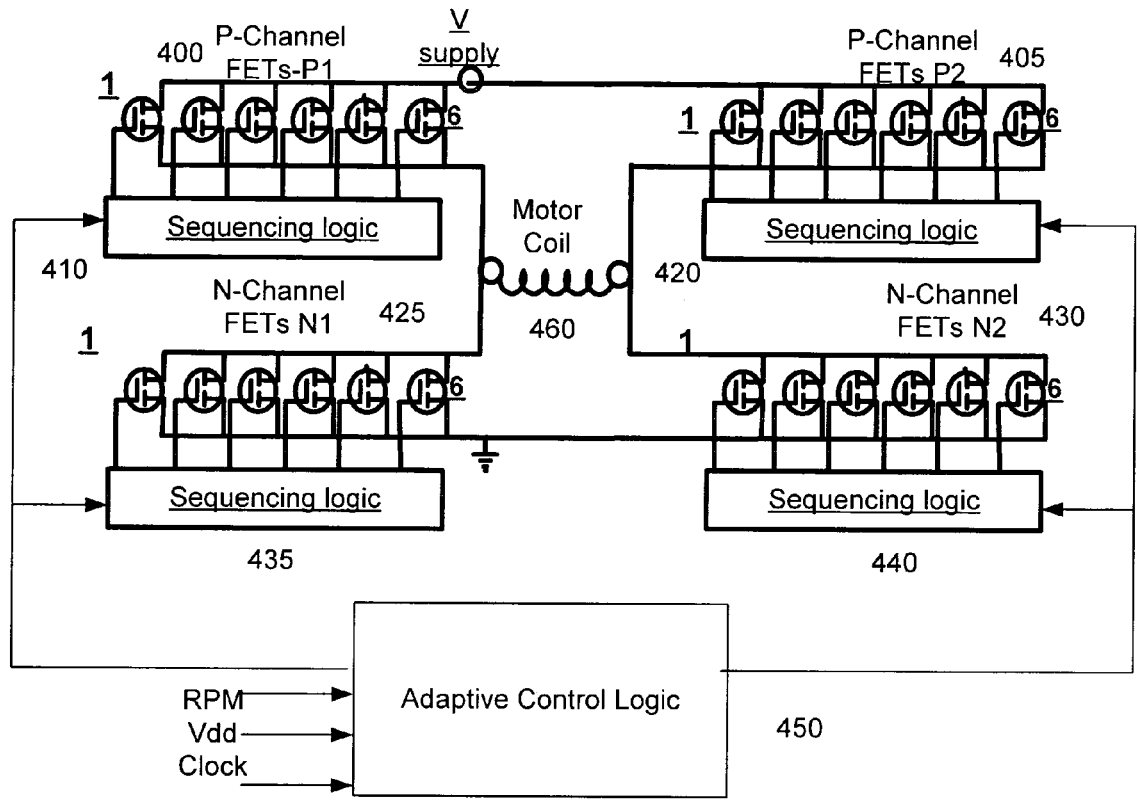
FIG. 8a is a block diagram perspective showing the sequential turn on drive for a full bridge single coil fan motor sequencing system configured in accordance with one embodiment of the present invention.

FIG. 8*a* shows one embodiment of the invention for a full bridge version in a single coil fan motor. There are four transistor segments 400, 405, 425, 430 each having six transistors coupled to a respective sequencing logic section. In this example, the supply voltage is coupled to each of the P-channel FETs of the transistor segments 400, 405 and the N-channel FETs are coupled to their respective transistor segments 425, 430 which are tied to ground. Each P-channel FET is coupled to the N-channel FET with the coil coupled there between. The Adaptive Control Logic 450 section is coupled to each sequencing logic section 410, 420, 435, 440.

Figure 8B:
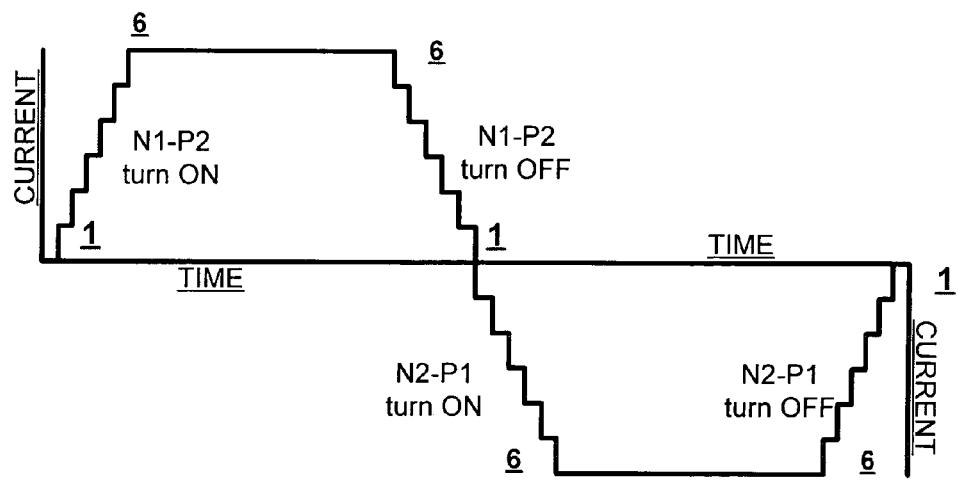

The current flows in two directions through the single coil motor winding. When FET section N1 425 and FET section P2 405 are sequentially turned 'On', full current flows for the 'On' period. FIG. 8*b* illustrates the stepped increase in the current until it reaches a maximum level. The FET section NI 425 and FET Section P2 405 are then sequentially turned 'Off' until the FET section N1 425 and FET Section P2 405 are all turned 'Off' and no current flows.

The FET section N2 430 and FET Section P1 400 are then sequentially activated and turned 'On' and the reverse current flow increases until it reaches a maximum reverse current value. The FET section N2 430 and FET Section P1 400 are then sequentially turned 'Off' one at a time until the reverse current flow decreases until it reaches a zero value.

In more particular detail, the Adaptive Control Logic section 450 starts the turn 'Off' sequence in advance of the "ideal" commutation point, based on calculation of the period/RPM minus the turn 'On' time. Otherwise, if the turn 'Off' starts at "ideal" commutation point, the turn 'Off' would occur too late. Turn 'Off' is a sequence of N1-P2 in reverse turning 'Off'. Reversing the current is similar with N2-P1 turning 'On' and 'Off'.

Figure 9:
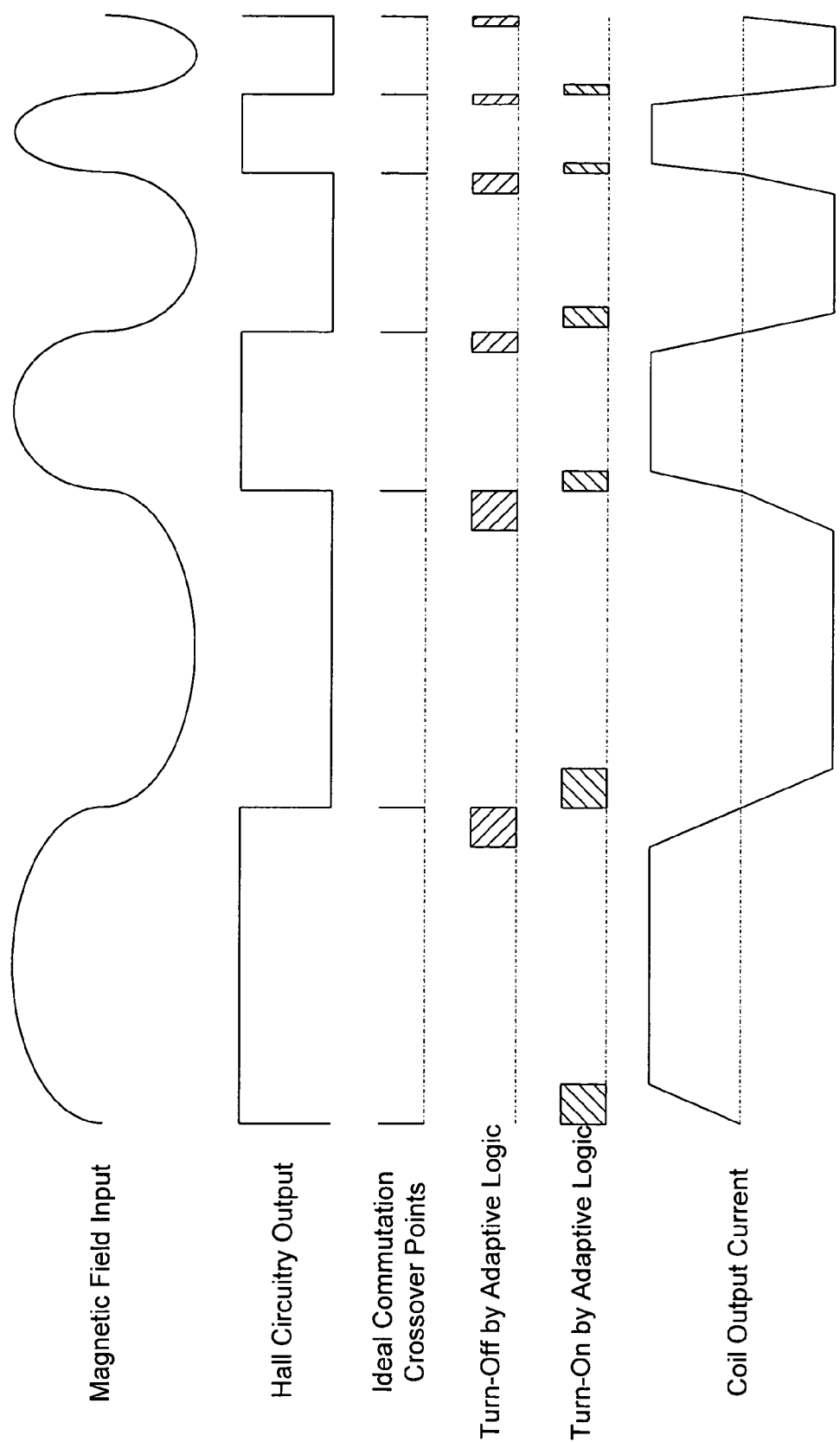
FIG. 9 shows a graphical perspective of the various signals of a single coil motor in order to illustrate timing aspects configured in accordance with one embodiment of the present invention.

FIG. 9 illustrates the single coil adaptive logic timing diagrams. As previously described, the magnetic field is displayed as a sinusoidal wave that tracks the speed of the motor (RPM). The time period for a cycle of the magnetic field is directly related to the speed of the motor. As illustrated, the speed of the motor is shown changing and increasing in speed. The Hall circuitry output tracks the magnetic field input but is approximately a square wave signal. The ideal commutation crossover points are indicated at the rising and falling edges of the Hall output.

The Turn-On and Turn-off windows by the Adaptive logic are illustrated and represent the respective rise time period and fall time period which is set by the adaptive logic section. The window representing the rise and/or fall time can be, for example, any percentage of the Hall signal. As noted in FIG. 9, the rise and fall time period decreases as the motor speed increases.

The Coil output current is depicted as a single waveform that has the rise/fall time corresponding to the rise/fall time period established by the adaptive logic section. As shown, the rise and fall time periods decrease at higher motor speeds.

One embodiment of the present invention adjusts the rise/fall windows depending upon a percentage value of the motor speed, which in turn represents the magnetic field cycle time. This percentage can be a fixed percentage or a variable percentage. For example, at faster speeds, a 10% window may still be too fast and cause excessive noise. In such a scenario, the percentage can be adjusted to a larger percentage such as 15%. The percentage, including any adjustment due to the increased speed depends upon design criteria and can be application specific. Low percentages indicate faster switching and tend to have increased noise. Higher percentages indicate slower switching which may decrease torque and lower efficiency.

Figure 10:
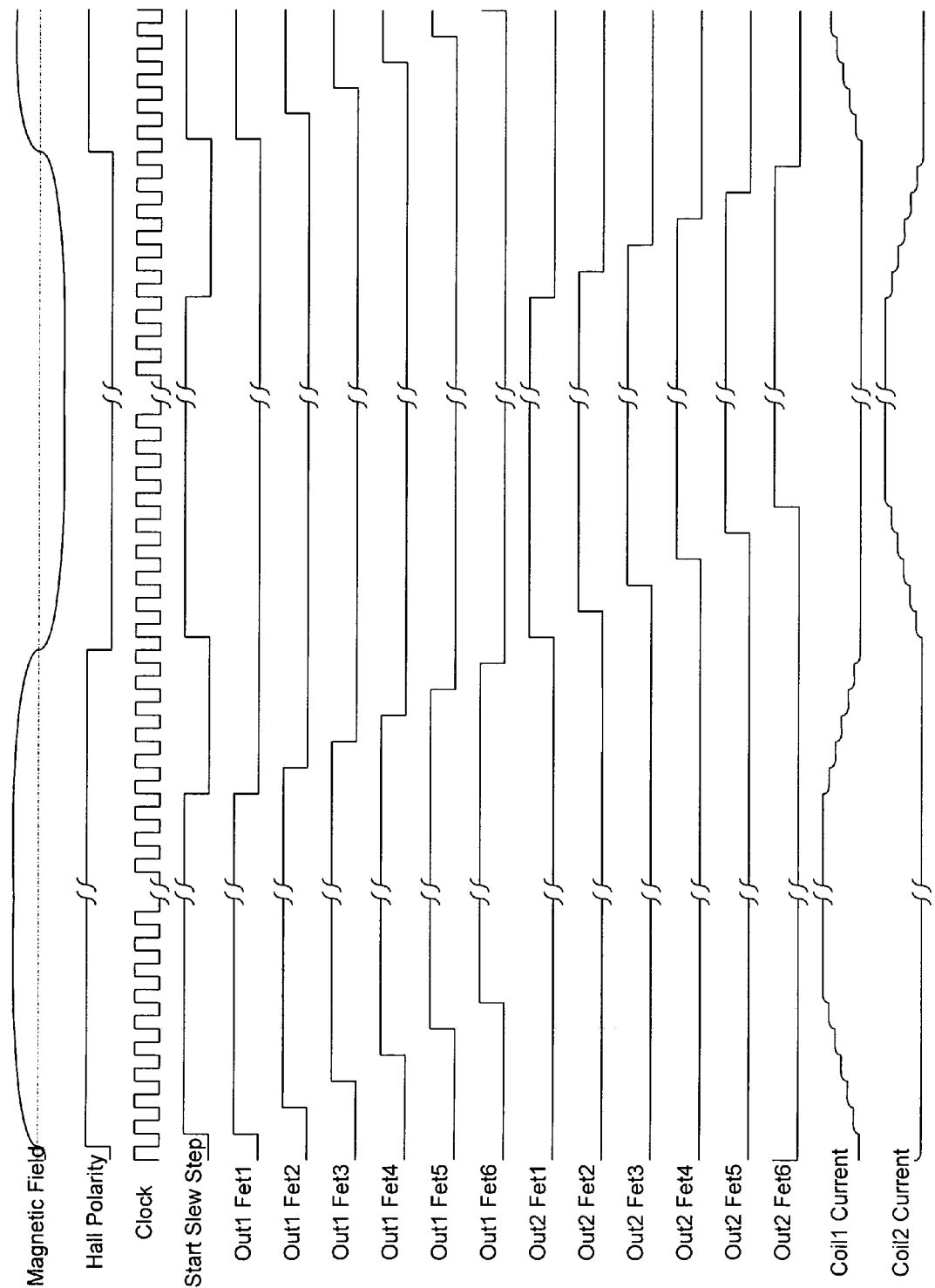
FIG. 10 depicts a graphical perspective of a two coil system illustrating the timing of the sequential transistors and the resulting linearized coil current configured in accordance with one embodiment of the present invention.

The sequencing logic for a two coil embodiment is shown in further detail in the graphical perspective of FIG. 10. As previously described, the magnetic field input is approximately a sinusoidal wave that changes with the speed of the motor (RPM). The Hall circuitry output is roughly a square wave that tracks the magnetic field. A slew clock can be used to provide the timing aspects for the sequential steps. In one embodiment the slew clock is not the system clock but rather some multiple of the system clock such as 4 or 8.

In operation of this embodiment, as the magnetic field rises the corresponding Hall square wave output goes High. At some clock multiple, in this example one clock cycle, the start slew step goes High as well as the first power transistor FET1 of the first transistor segment. As FET1 is turned 'On', there is a small increase in the Coil1 current. At each clock cycle or multiple of clock cycles, the transistors are sequentially turned 'On' and the Coil1 current gradually increases at each step. Once the last transistor is turned 'On', FET6 in this example, the Coil1 current is at the peak value. Thus for a transistor segment having six transistors, the rise time is the time it takes for all six transistors to be turned 'On'.

As previously described herein, the stepping of the transistors 'On' and 'Off' within a transistor segment is depicted in a linear fashion. However, the individual transistors in a segment can be set to turn 'On' and 'Off' at any clock cycle multiple such that the number of clock cycles between FET1 and FET2 can be different than the number of clock cycles between FET5 and FET6. This provides a programmable rise/fall time as well as a means to alter the coil current draw in manner that is optimized for a particular design.

As previously noted, the circuit time constant is somewhat reflected by the relationship of Inductance (L)/Resistance (R). At Turn-On, the L/R relationship is essentially passive. At Turn-Off, the L/R aspects are primarily dictated by the L and its' stored energy. The current increase at Turn-Off therefore can be different from the current increase at Turn-On, and it can be changed within the chip. Therefore, the slope of the rise can differ from the slope of the fall.

The programmable aspects are extended to the total coil output current as the time interval for the rise time, the peak time, and the fall time can be altered to optimize the design for a particular embodiment.

In yet a further embodiment, the number of transistors can be altered such that number of transistors in one segment can differ from the number of transistors in another segment. The number of transistors can be a fixed design, such as only having six transistors in a first segment and four transistors in a second segment. Alternatively, the number of transistors can be programmable such that the design can include eight transistors in each segment, but only six transistors can be activated in a first segment and four transistors in a second segment. Such flexibility in the design and customized programmability allow the designer to use a single design that can be integrated into multiple applications.

The peak state in one aspect is maintained for some clock multiple and then the signal is slowly decreased by sequentially turning 'Off' the transistors of the first transistor segment, which in this example progresses from FET1 to FET6. The last transistor from the first segment is turned 'Off' within the cycle of the Hall circuit, which in turn represents the magnetic field that is directly related to the RPM. This prevents the possibility of having the coils simultaneously being active.

Within one or more cycles after the Hall circuit transitions from a logic High to a logic Low, the transistors from the second segment are sequentially activated in any of the manners as detailed herein. For example, FET1 is turned 'On' first and the Coil2 current increases by a single step. As each of the transistors FET2-FET6 of the second segment are turned 'On', the coil2 current gradually increases until the peak value is established. After the peak period has elapsed, the transistors of the second segment are sequentially turned 'Off' until all these transistors are turned 'Off', which occurs before the Hall output transitions from a logic Low to a Logic High. In this example, both the turn "On" and turn "Off" sequence orders of the transistor (Q1 through Qn) are the same. But, in other embodiments the turn "On" transistor sequence order could be different from the turn "Off" transistor sequence order.

As previously described, the rise time, peak time and fall time represent one cycle of the magnetic field input which corresponds to the RPM. Viewing the cycle as a time interval, the rise time can be a percentage, such as 10%; the peak time can be 80%; and the fall time can be 10%. In other examples, the rise time and can be 5%, the peak time can be 75% and the fall time can be 15%. It is readily apparent to one skilled in the art that the percentage of rise time, peak time and fall time can be optimized for a particular design.

The present invention includes electronically adapting to different L/R values thereby making the design more generic to a wide array of motors. In one embodiment the present invention can measure the time constant of the motor on chip on every start-up and use memory such as RAM to store such data. This time constant can also be measured by monitoring the exponential rise time of the current. For approximation purposes, it is possible to measure R without L by measuring the current. In another embodiment, the present invention can measure the time constant of the motor on chip on the first start-up and use non-volatile RAM to store such data.

Figure 11:
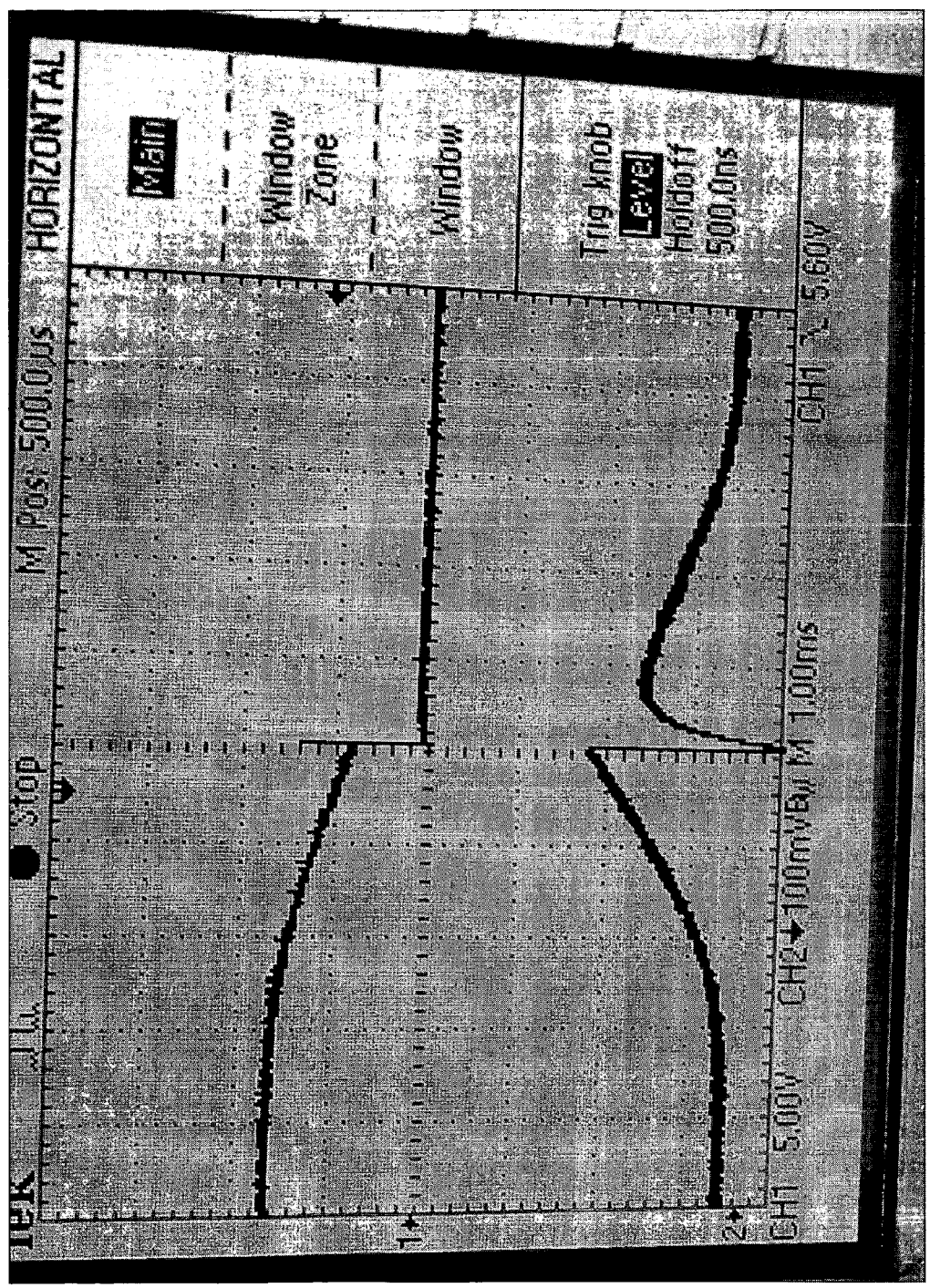
FIG. 11 shows an oscilloscope display from a two coil motor with a conventional square drive operation.

Referring to FIG. 11, the square wave drive of a typical two coil fan operating is displayed on an oscilloscope and the applicable settings are noted. The upper trace is Voltage applied to one of the motor coils of the two coil motor fan. The lower channel 2 trace is the total current from each of two coils. The upper channel 1 trace shows a total voltage swing and the associated noise.

With respect to the lower channel 2 trace, it can be seen that the current decrease in the coil is "abrupt" which causes a mechanical shock producing an audible noise similar to the noise in an overloaded transformer or power line transformer. As detailed herein, these abrupt swings in the current forms the basis of the commutation noise.

Figure 12:
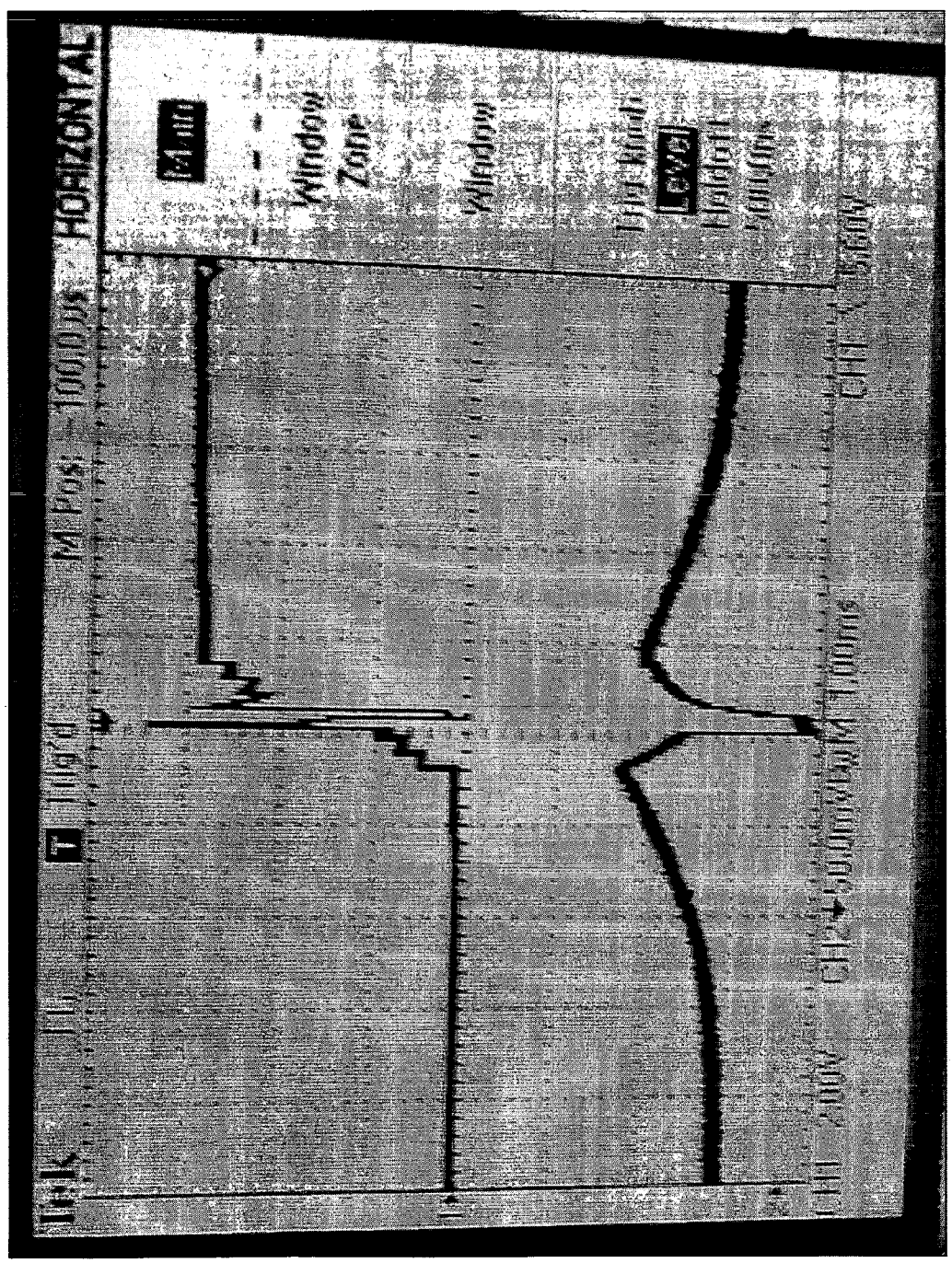
FIG. 12 shows an oscilloscope display from a one coil motor with a sequential turn on HBridge drive for an expanded time base configured in accordance with one embodiment of the present invention.

FIG. 12 shows the voltage (upper) channel 1 and current (lower) channel 2 waveforms for the sequential drive configured in accordance with one embodiment of the present invention. It is shown that the resulting current swing in the lower channel 2 trace slowly increases and decreases without dramatic swings as evidenced in the state of the art designs. Therefore, noise generated as a result of commutation is significantly reduced as shown in the upper channel 1 trace. The "sharper" portion of the current decrease waveform can be reduced further by using the techniques detailed herein for a particular motor.

One of the concerns taken into account in the present design is the packaging of the circuit. Circuit elements that are large or have a high component count are not practical in small configuration. In addition, circuit designs that process large signals tend to have higher thermal characteristics which are disfavored in designs.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A motor controller system for reducing fan noise, the system comprising:
    a plurality of transistors coupled in parallel forming a first transistor segment;
    a plurality of transistors coupled in parallel forming a second transistor segment;
    a first fan coil coupled to said first transistor segment on a first end and coupled to a supply voltage of a second end;
    a second fan coil coupled to said second transistor segment on a first end and coupled to said supply voltage of a second end;
    a first sequencing logic section coupled to each of said transistors in said first transistor segment, wherein said first sequencing logic section sequentially activates and deactivates at least some of said transistors in said first segment one at a time;
    a second sequencing logic section coupled to each of said transistors in said second transistor segment, wherein said second sequencing logic section sequentially actives and deactivates at least some of said transistors in said second segment one at a time; and
    wherein a rise time coil output current and a fall time coil output current of said first fan coil and said second fan coil approximates a linear slope of a straight line and are controlled so as to minimize abrupt changes.

2. The system according to claim 1, further comprising an adaptive logic section coupled to said first and second sequencing logic section.

3. The system according to claim 1, further comprising a magnetic sensor coupled on one end to said first end of the first fan coil and said first end of the second fan coil, and coupled on another end to said first sequencing logic section and said second sequencing logic section.

4. The system according to claim 1, wherein said first and second sequencing logic section sequentially actives and deactivates all of said transistors in said first and second segment.

5. The system according to claim 1, further comprising a voltage regulator coupled to said first coil and said second coil.

6. The system according to claim 1, wherein control of said rise time and said fall time is accomplished using an inductor (L)/resistor (R) time constant.

7. The system according to claim 1, where said rise time and said fall time are programmable.

8. A method for controlling a motor, comprising:
    coupling at least one transistor segment to at least one motor coil, wherein each said transistor segment has a plurality of transistors;
    sequentially activating said transistors of said transistor segment one at a time thereby sequentially increasing a current flow through said coil, wherein said sequentially activating is done within a turn-on window;
    sequentially deactivating said transistors of said transistor segment one at a time thereby sequentially decreasing a current flow through said coil, wherein said sequentially deactivating is done within a turn-off window; and
    processing said turn-on window and said turn-off window to provide a linearly controlled rise time and a linearly controlled fall time which approximates a respective linear slope of a straight line for a coil output current.

9. The method according to claim 8, further comprising repeating said sequentially activating and sequentially deactivating for other transistor segments.

10. The method according to claim 8, wherein said linearly controlled rise time is different than said linearly controlled fall time.

11. The method according to claim 8, wherein said linearly controlled rise time and said linearly controlled fall time is a percentage of a total cycle period.

12. The method according to claim 8, wherein a number of said transistors in said transistor segment is programmable.

13. The method according to claim 8, wherein said processing is based on a number of clock cycles of a slew clock.

14. The method according to claim 8, further comprising preventing simultaneously activating any of said plurality of transistors of one said transistor segment with any of said plurality of transistors of another said transistor segment.

15. The method according to claim 8, further comprising a means for electronically adapting to a plurality of motors having different time constants.

16. An apparatus for controlling a DC motor, comprising:
    a magnetic sensor coupled to said motor;
    at least one sequencing logic section coupled to said magnetic sensor;
    a transistor segment coupled to each said sequencing logic section, wherein said transistor segment has a plurality of transistors in each segment;
    at least one motor coil coupled to at least one said transistor segment; and
    wherein a rise time and a fall time of a coil current of each said coil is linearly controlled using an inductor (L)/resistor (R) time constant to approximate a linear slope of a straight line for a coil output current.

17. The apparatus according to claim 16, further comprising an adaptive control logic section coupled to each said sequencing logic section.

18. The apparatus according to claim 17, wherein said magnetic sensor, said at least one sequencing logic section, said transistor segment, and said adaptive control logic section are integrated into a single chip.

19. The apparatus according to claim 16, further comprising a full bridge configuration having four of said transistor segments coupled to a single coil.

20. The apparatus according claim 16 wherein said transistors are selected from at least one of the group consisting of: field effect transistors and bipolar transistors.

* * * * *